United States Patent

Chambers

[15] 3,670,960

[45] June 20, 1972

[54] CONTROL APPARATUS

[72] Inventor: William W. Chambers, Anaheim, Calif.

[73] Assignee: Robertshaw Controls Company, Richmond, Va.

[22] Filed: Sept. 14, 1970

[21] Appl. No.: 72,215

Related U.S. Application Data

[62] Division of Ser. No. 814,939, April 10, 1969, abandoned.

[52] U.S. Cl. ...............236/11, 219/511, 236/68 C, 236/78, 317/DIG. 6, 431/37
[51] Int. Cl. .......................................................G05d 23/24
[58] Field of Search...............236/68 B, 68 R, 68 C, 11, 78 A; 219/511; 317/DIG. 6 X, 148.5 BX; 307/252 W; 431/37

[56] References Cited

UNITED STATES PATENTS

| | | | |
|---|---|---|---|
| 2,467,425 | 4/1949 | Cobb | 236/11 UX |
| 3,378,747 | 4/1968 | Brown | 318/345 |
| 3,549,088 | 12/1970 | Obenhaus | 236/11 X |

Primary Examiner—William E. Wayner
Attorney—Fulwider Patton Rieber Lee & Utecht

[57] ABSTRACT

A control apparatus comprising a switch controlling current flow to an inductance means which is coupled with a controlled element. A free wheeling resistor is connected in parallel with the inductance means and defines a path for reverse flow of induced current therethrough during collapse of the magnetic field in the inductance means. A heat responsive control circuit is provided for controlling a controlled device and includes a heat responsive element disposed in heat exchange relationship with the resistor whereby when the switch is turned on current during positive going half cycles will be directed through both the resistor and inductance means, and the current induced by collapse of the magnetic field in the inductance means will flow in the reverse direction through the resistor thereby permitting continued flow in the forward direction through the inductance means and after a selected time the self-heating of the resistor will heat the temperature responsive element to actuate the control circuit and, consequently, the controlled device.

8 Claims, 5 Drawing Figures

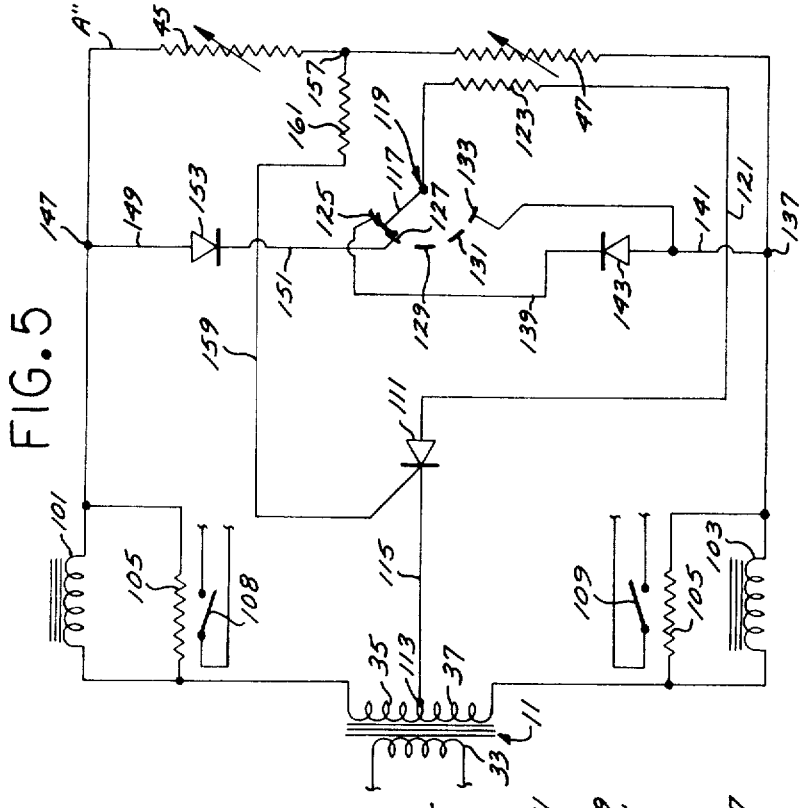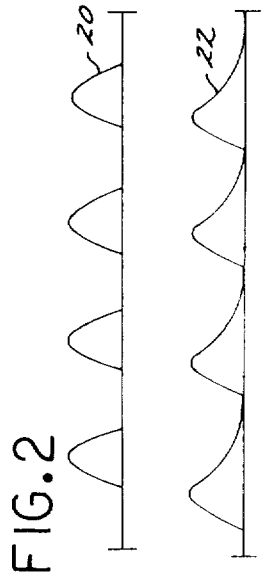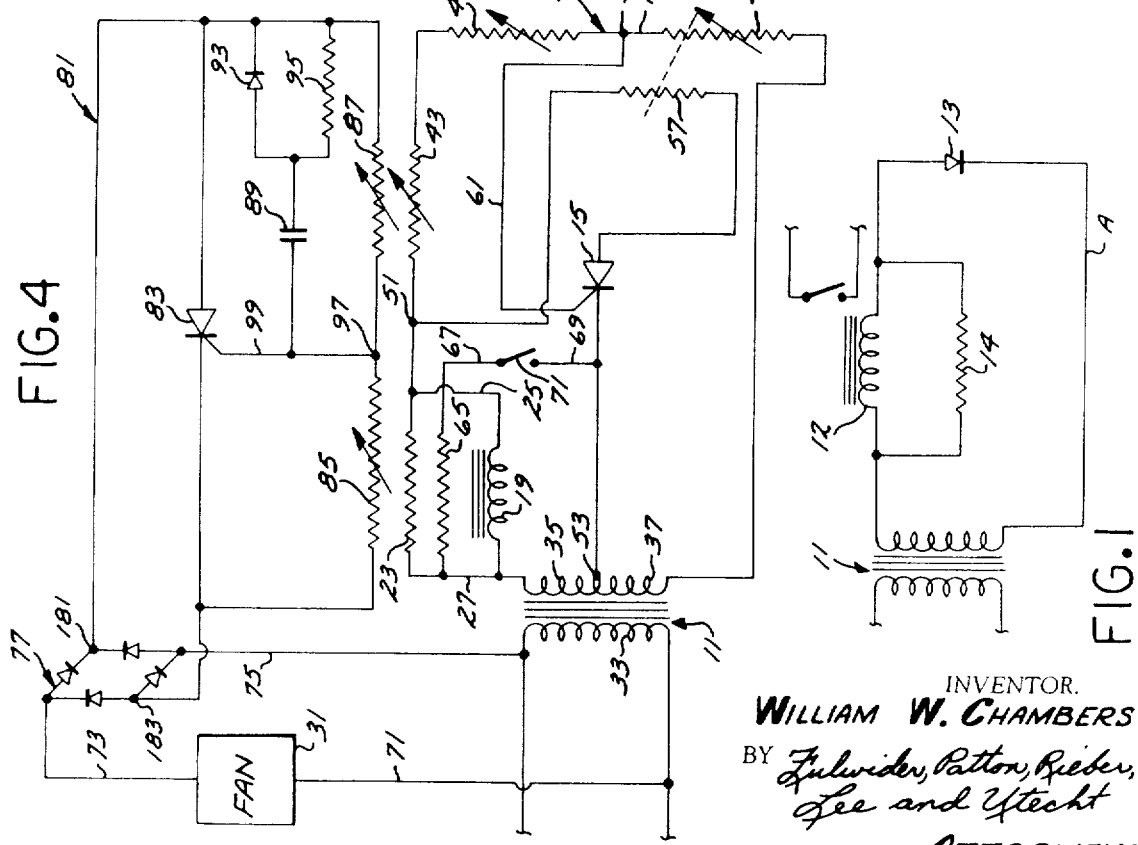

CONTROL APPARATUS

CROSS REFERENCE TO RELATED APPLICATIONS

This application is a divisional application of Ser. No. 814,939, filed Apr. 10, 1969, now abandoned.

BACKGROUND OF THE INVENTION

1. Field of the Invention

The present invention relates to apparatus for controlling AC current which is converted to pulsating DC current by a switching means.

2. Description of the Prior Art

In systems in which pulsating direct current is applied to a coil or the like, it has been common practice to utilize a capacitor in parallel with the coil to store current for delivery to the coil during the off portions of the pulsating current cycle. U.S. Pat. Nos. 3,086,147 and 3,343,158 show the use of capacitors in this manner.

It has also been common practice to employ a diode in parallel with the coil and to pole such diode so as to direct current flow through the coil during the forward direction of current flow and to provide a path for reverse current flow to permit collapse of the magnetic field in the coil to generate a forward flow of current in the coil during the off portion of the pulsating DC.

Resistors have been employed in parallel with a coil as shown in U.S. Pat. Nos. 2,941,128, 2,942,151 and 2,973,469 but applicant is unaware of any prior art control devices in which resistors of this type are selected so as to produce a self-heating effect and wherein such heating is utilized to trigger a heat responsive control circuit.

SUMMARY OF THE INVENTION

A control apparatus including a switch means connected with an AC power source, such switch means being operative in response to application of AC power to produce a pulsating DC output which is applied to a controlled operator having an inductance means connected with the switch means. A free wheeling resistor is connected in shunt relationship with said inductance means whereby current is permitted to flow through the inductance means during fractional cycles of increasing current amplitude to build up a magnetic field in the inductance means, the free wheeling resistor providing a return path for the reverse flow of induced current caused by collapse of said magnetic field during fractional cycles of decreasing current amplitude, thus prolonging current flow through the inductance means. A control circuit is provided for controlling a controlled device and includes a heat responsive element disposed in heat exchange relationship with such resistor whereby the self-heating of such resistor will heat such element to actuate the control circuit to render the controlled drive operative a selected time after the switch means is rendered conductive.

An object of the present invention is to provide a control system which eliminates hum and chatter from an inductance means included therein.

Another object of the invention is the utilization of said resistance in shunt relationship with the inductance means of a control system in which pulsating direct current is applied to the inductance means for operation of an associated component or controlled element, the resistance means serving to prolong current flow through the inductance means to thereby provide a higher percentage of time of operation of the controlled element.

Another object of the present invention is to provide a control apparatus of the type described wherein a free wheeling resistor serves as a heat motor for operating a temperature sensitive controlled element.

These and other objects and the advantages of the present invention will become apparent from a consideration of the following description when taken in conjunction with the accompanying drawing.

DESCRIPTION OF THE DRAWING

FIG. 1 is an electrical schematic of a control apparatus embodying the present invention;

FIG. 2 is a current diagram depicting the pulsating direct current which would be imposed on the operator included in the apparatus shown in FIG. 1 without a free wheeling resistor in parallel therewith;

FIG. 3 is a current diagram depicting the prolongation of the current flow applied to the operator of the apparatus shown in FIG. 1, as achieved by the utilization of a free wheeling resistor; and FIG. 4 is an electrical schematic of an environmental control system embodying the present invention; and FIG. 5 is an electrical schematic of a second environmental control system embodying the present invention.

DESCRIPTION OF THE PREFERRED EMBODIMENT

Referring to FIG. 1, the control apparatus A shown therein includes a transformer 11 to which AC is applied to provide current to a relay 12 having a diode 13 in series with the coil thereof. A free wheeling resistor 14 is connected in parallel with the coil of the relay 12. Thus, when AC is applied to the transformer 11, the forward biased diode 13 will pass only positive pulses of current thereby providing pulsating direct current through the coil of the relay 12. During positive going portions of the current cycle, energy is stored in the coil of the relay 12 in the form of magnetic flux. During the negative going portions of the current cycle, when the current decreases sufficiently to commence collapsing of the magnetic field in the relay coil, the stored energy becomes available in the form of voltage generated in such coil. If the free wheeling resistor 14 were eleminated, the said generated voltage would merely buck the applied voltage thereby producing hum and chatter. However, the free wheeling resistor 14 permits reverse flow of current therethrough during the negative portions of the current cycle and preferably provides sufficient reverse current flow to spread the holding effect of the coil of the relay 11 so as to eliminate hum and chatter.

Referring to FIG. 4, the control apparatus A' shown therein includes a transformer, generally designated 11, to which AC is applied to provide current to a silicon controlled rectifier (SCR) 15. The SCR 15 acts as a switch to control current to a relay 19 which operates a gas valve (not shown) which controls the flow of gas to a heater (not shown). A free wheeling resistor 23 is connected in parallel with the relay 19 by means of leads 25 and 27. Triggering of the SCR 15 on alternate half cycles of the alternating current applied thereto produces a pulsating direct current which causes a magnetic field to be built up in the relay 19 during positive going fractional cycles. The current induced by collapse of said magnetic field during negative going fractional cycles follows a reverse path through the resistor 23. This prolongs the period of energization of the relay 19 and prevents hum and chatter of the relay 19.

The apparatus A with which the shunt connected relay 19 and resistor 23 are associated is responsive to lowering of the environmental temperature to cause the relay 19 to open said gas valve (not shown) and, after a predetermined time, operated a controlled device in the form of a blower fan 31 to blow air over such heater for circulation of heated air throughout the environment.

The transformer 11 includes a primary coil 33 and a center tap secondary coil which forms upper and lower secondary halves 35 and 37, respectively. The secondary coil forms part of a temperature sensitive bridge, generally designated 41, which also includes the free wheeling resistor 23, a calibration potentiometer 43, a selector potentiometer 45, and a sensing thermistor 47.

The SCR 15 has its anode connected to a node 51 of the bridge 41, the node 51 being located between the free wheeling resistor 23 and the calibration potentionmeter 43. The cathode of the SCR 15 is connected to the center tap 53 of the secondary coil of the transformer 11. Included in series with the power circuit of the SCR 15 is a feedback resistor 57 which is disposed in heat exchange relationship with the sensing thermistor 47. The gate of the SCR 15 is connected to a bridge node 59 located between the selector potentiometer 45 and the sensing thermistor 47 by means of a lead 61.

A remote actuated load or heat motor, designated by the resistance element at 65, is connected across the upper half 35 of the secondary coil of the transformer 11 by means of leads 67 and 69 and a manual switch 71, the purpose of such heat motor being set forth hereinafter.

The fan 31 is connected across the primary coil 33 by means of a power circuit including leads 71, 73 and 75 and a full wave rectifier bridge, generally designated 77. A control circuit, generally designated 81, is provided for controlling the fan 31 and includes an SCR 83 which is triggered by the unbalance of current between a triggering thermistor 85 and a variable resistor 87. Connected in parallel with the variable resistor 87 is a wave-forming network comprised of a capacitor 89 in series with a charge circuit which includes a diode 93 connected in parallel with a resistor 95. The gate of the SCR 83 is connected to the juncture 97 between the triggering thermistor 85 and the variable resistor 87 by means of a lead 99.

In operation of the apparatus A', the sensor thermistor 47 is disposed in the environment whose temperature is to be controlled, and AC power is applied to the primary coil 33 of the transformer 11. As long as the temperature of the environment remains within the range set by the selector potentiometer 45, the bridge 41 remains balanced and the SCR 15 is nonconductive. When the temperature of the environment falls below the preset or target temperature a predetermined amount, the sensing thermistor 47 is cooled sufficiently to cause a current to flow at the node 59. The current is positive with respect to the current at the center tap 53 of the secondary coil and triggers the SCR 15 at a predetermined level of current flow to render the SCR conductive. This initiates current flow through the parallel connected gas valve relay 19 and free wheeling resistor 23. Energization of the gas valve relay 19 opens the gas valve (not shown) to start the heater (not shown) and initiate warming of the environment.

Since the SCR 15 is forward biased, it will conduct only during a fraction of each cycle of the AC current, that is the SCR 15 conducts only during alternate half cycles of the alternating current flow applied to it. This provides a pulsating DC current to the relay 19. Without the free wheeling resistor 23 the current through the relay 19 would define generally symmetrical positive pulses 20, as shown in FIG. 2. However, use of the free wheeling resistor 23 provides the current pulses 22 shown in FIG. 3. More particularly, although the resistor 23 has the effect of reducing the overall amplitude of the current flow, it has the very desirable effect of prolonging current flow through the relay 19. This results because the magnetic field build up in the relay 19 during positive going fractions of the current cycle collapses and provides an induced current flow during negative going fractions of the current cycle. The free wheeling resistor 23 serves to pass the induced current in the reverse direction during collapse of such magnetic field to thereby eleiminate hum and chatter of the relay 19 by prolonging the period during which there is current flow through the relay 19.

In the control apparatus A' shown, the free wheeling resistor 23 is also utilized to heat the thermistor 85 to increase its resistance and unbalance the bridge 81. Unbalancing of the bridge 81 applies a triggering current to the gate of the SCR 83 to cause it to become conducting and enable current flow from the bridge rectifier DC node 181 to the node 183. This causes AC to flow on the AC side of the bridge 77 to operate the fan 31.

The capacitor 89 between the anode and gate of the SCR 83 is charged at a rate determined by the resistor 95, and is discharged at a rate determined by the diode 93 to form the triggering signal imposed on the gate to reach the triggering level early in the cycle and continue above the triggering level relatively late in the cycle, thus providing for current flow throughout a relatively large portion of the entire current cycle.

As set forth in my co-pending U.S. application entitled TEMPERATURE CONTROL SYSTEM PROVIDING FULL WAVE INDUCTION INTO TEMPERATURE CHANGE APPARATUS, filed Sept. 5, 1968, and assigned Ser. No. 757,695, the feedback resistor 57 will be heated when the SCR 15 is rendered conductive, and will heat the sensing thermistor 47 slightly to reduce the resistance of the thermistor 47. This compensates for the drop in potential across the potentiometer 45 and selector 47 caused by the SCR 15 becoming conductive to initiate current flow through the resistor 23, relay 19, feedback resistor 57, and top half of the secondary coil 35. This avoids the necessity of requiring the environment to be heated above the target temperature to again balance the bridge 41 and render the controlled SCR 15 non-conductive to energize the heater relay 19.

Whenever it is desirable to operate the fan 31 without energization of the gas valve relay 19, the remote switch 71 may be closed to complete the circuit through the heat motor 65 to heat the triggering resistor 85 and trigger the SCR 83 to initiate current flow through the fan 31.

The control apparatus A" shown in FIG. 5 is similar to that shown in FIG. 4 and includes a transformer 11 having a primary coil 33 and a secondary coil formed into two halves 35 and 37 by a center tap 113. A temperature sensing bridge includes a selector potentiometer 45 and a sensing thermistor 47 and is responsive to temperature changes to operate either a gas valve relay 101 of a heating system or a compressor relay 103 of a cooling system to initiate corresponding heating or cooling. Free wheeling resistors 105 and 107 are connected in parallel with the respective relays 101 and 103 and are disposed in heat exchange relationship with respective time delay thermostatic blades 108 and 109, respectively, to activate an air circulation fan (not shown) a predetermined period of time after the heater or air conditioner is operated.

An SCR 111 has its cathode connected to the center tap 113 of the secondary coil of the transformer 11 by means of a lead 115. The anode of the SCR 111 is connected with the wiper 117 of a selector switch, generally designated 119, by means of a lead 121 including a feedback resistor 123 disposed in heat exchange relationship with the sensor thermistor 47.

The selector switch 119 includes an automatic cooling contact or bar 125, a heating contact or bar 127, a pair of off contacts or bars 129 and 131 and a cooling contact or bar 133. The automatic cooling bar 125 is connected with a bridge node 137 by means of leads 139 and 141 and a blocking diode 143. The bridge 137 is located at the juncture of the sensing thermistor 47 and the cooling relay 103.

The heating bar 127 is connected to a bridge node 147 located at the juncture of the selector potentiometer 45 and the heating relay 101, the connection being by means of leads 149 and 151 and a blocking diode 153.

The gate of the SCR 111 is connected with a juncture 157 of the selector potentiometer 45 and the sensor thermistor 47 by means of a lead 159 which includes a current limiting resistor 161.

The relay-free wheeling resistor combination of the apparatus A" of FIG. 5 operates in a manner similar to that of the apparatus shown in FIG. 4 except that in addition to providing a free wheeling effect for the relay coil, the free wheeling resistor provides heat to operate a heat responsive time delay device.

Assuming the apparatus A" is to be utilized to automatically initiate heating or cooling, as dictated by the environmental temperature, the wiper 117 on the selector switch 119 is set to contact both the cooling and heating bars 125 and 127, respectively, as shown in FIG. 5. In this setting, when the sensing thermistor 47 is cooled sufficiently by the environment, the node 157 is driven positive with respect to the center tap 113 to trigger the SCR 111. Current flow then occurs through the gas valve relay 101, free wheeling resistor 105, diode 153, feedback resistor 123 and the SCR 111. The resistor 105 serves as a path for reverse flow of current induced by collapse of the magnetic field in the relay 101 during negative going fractional cycles, eliminating hum and chatter and prolonging the period of current flow through the relay 101. Also, the resistor 105, after a predetermined period of time, will be heated sufficiently to heat and close the switch 108 to energize the circulation fan and circulate heated air throughout the environment. It is noted that the diode 143 blocks current flow from the automatic cooling bar 125 to the cooling relay 103, thus preventing undesired activation thereof.

When the environment becomes heated sufficiently to heat the sensor 47 to a level which balances the bridge and reduces the current imposed on the gate of the SCR 111 below its threshold level, the SCR becomes non-conductive and current no longer flows to the gas valve relay 101 and the free wheeling resistor 105.

When the sensing thermistor 47 is heated above the temperature range set by the selector potentiometer 45, the resistance of the sensing thermistor 47 is reduced sufficiently that the bridge is unbalanced, that is, there is a voltage drop between the node 157 and the center tap 113. This triggers the SCR 111 and current flow commences through the relay 103, free wheeling resistor 107, diode 143, feedback resistor 123 and SCR 111. After a predetermined period of time, the free wheeling resistor 107 will be heated sufficiently to heat and close the switch 109 to energize a fan and commence blowing of cool air throughout the environment. When the environment has been sufficiently cooled, the sensing thermistor 47 effects rebalance of the bridge, the SCR 111 is rendered non-conductive, which results in discontinuance of operation of the air conditioning system and the fan.

The control apparatus A″ can be shut off or rendered entirely inoperative by rotating the wiper 117 to the off bars 129 and 131. When only the heating or cooling system is to be operative, the wiper 117 is rotated to the respective bars 125 or 133.

From the foregoing, it will be apparent that the control apparatus of the present invention provides a highly economical and reliable means for operating an inductance type operator while avoiding hum and chatter in the inductance means. Further, the free wheeling resistor may be utilized to operate a secondary control circuit.

Various modifications and changes may be made with regard to the foregoing detailed description without departing from the spirit of the invention.

What is claimed is:

1. Control apparatus to be connected with an AC source for actuating an operator, said apparatus comprising:

switch means connected with said AC source and operative in response to application of AC current to produce a pulsating DC output;

inductance means connected with said switch means and coupled with said operator;

a control circuit for operating a controlled device and including a heat responsive element operative upon reaching a selected temperature to actuate said controlled device; and a free wheeling resistor connected in shunt relationship with said inductance means and defining a return path for the reverse flow of induced current, said resistor being disposed in heat exchange relationship with said heat responsive element whereby upon operation of said switch means, a magnetic field builds up in said inductance means during fractional cycles of increasing amplitude of said pulsating direct current and said resistor provides a path for the flow of current induced by the collapse of said magnetic field during fractional cycles of decreasing amplitude and after a predetermined time said resistor will be heated sufficiently to cause said control circuit to actuate said controlled device.

2. Control apparatus as set forth in claim 1 wherein:

said operator controls a heater; and said controlled device includes circulation means for circulating fluid in heat exchange relationship with said heater whereby said circulation means will be actuated only after said heater has been actuated.

3. Control apparatus as set forth in claim 1 wherein said operator is adapted to operate a temperature change apparatus and wherein:

said switching means comprises a silicon controlled rectifier; and wherein said control circuit is in the form of a bridge having a temperature responsive sensor connected with the gate of said silicon controlled rectifier and operative to impose a triggering signal on said gate when the temperature of the environment within which said sensor is disposed falls outside a predetermined temperature range.

4. Control apparatus as set forth in claim 1 wherein said operator operates a heater and wherein said apparatus further includes:

a second operator for actuating an air conditioning means;

a second inductance means connected with said switch means and coupled with said second operator;

a second free wheeling resistor connected in shunt relationship with said second operator; and a sensing circuit including a temperature sensor for sensing the environmental temperature, said sensing circuit being operative, upon said sensor being heated above a predetermined temperature, to actuate said switch means and direct current flow through said first-mentioned inductance means and first-mentioned resistor, and being further operative upon cooling of said sensor below a selected temperature to actuate said switch means and direct current flow through said second inductance means and said second resistor.

5. Control apparatus as set forth in claim 4 wherein:

said controlled device includes a blower fan for selectively blowing air in heat exchange relationship with said heater or said air conditioning means; and said control circuit is connected with said fan and includes a second heat responsive element disposed in heat exchange relationship with said second free wheeling resistor and responsive to heating thereof to actuate said control circuit and operate said fan.

6. Control apparatus as set forth in claim 4 wherein:

said switch means comprises a silicon controlled rectifier.

7. Control apparatus as set forth in claim 5 wherein:

said switch means comprises a silicon controlled rectifier.

8. Control apparatus as set forth in claim 1 wherein:

said free wheeling resistor is a non-rectifying element.

* * * * *